United States Patent [19]
Sosin
[11] 3,740,756
[45] June 19, 1973

[54] SWITCHING SYSTEM FOR PLURAL ANTENNAS CONNECTED TO PLURAL INPUTS

[75] Inventor: Boleslaw Marian Sosin, Chelmsford, England
[73] Assignee: The Marconi Company Limited, Chelmsford, England

[22] Filed: Mar. 20, 1972
[21] Appl. No.: 236,272

[30] Foreign Application Priority Data
Mar. 26, 1971 Great Britain .................... 8,032/71

[52] U.S. Cl. .................... 343/853, 343/858, 333/11
[51] Int. Cl. .......................................... H01q 21/00
[58] Field of Search ................. 343/853, 854, 858; 333/11

[56] References Cited
UNITED STATES PATENTS
3,295,134 12/1966 Lowe ................................ 343/854
3,226,724 12/1965 Brueckmann ....................... 343/853

*Primary Examiner*—Eli Lieberman
*Attorney*—Donald M. Wight, Charles E. Brown and Vincent L. Ramik

[57] ABSTRACT

Signals having a pre-determined phase relationship are switched to one of four aerials by two pairs of hybrid circuits. The signals are applied to the four inputs of the first pair of hybrid circuits, and the aerials are connected to the outputs of the second pair. Each output of each circuit in the first pair is connected to an input on a different one of the second pair of circuits. A further two pairs of hybrid circuits, similarly interconnected, may be used to derive the required phase relationship from a signal applied to a single input.

6 Claims, 3 Drawing Figures

| | | | | |
|---|---|---|---|---|
| a | 0° | 0° | 0° | 0° |
| b | 0° | 0° | 180° | 180° |
| c | 0° | 180° | 0° | 180° |
| d | 0° | 180° | 180° | 0° |

SWITCHING SYSTEM FOR PLURAL ANTENNAS CONNECTED TO PLURAL INPUTS

This invention relates to switching systems and more particularly to switching systems suitable for switching signals from a plurality of inputs to a selectable one of a plurality of utilisation devices.

In the multiple frequency operation of wideband transmitters it is common to use two or more utilisation devices (e.g. aerials) designed to operate within different frequency ranges. In known switching systems suitable for switching signals between two or more such utilisation devices crossover filters are provided. Crossover filters are difficult to design, and are expensive, and this invention seeks to provide a switching system which does not incorporate crossover filters.

According to this invention a switching system suitable for switching signals from a plurality of inputs to a selectable one of four utilisation devices comprises two pairs of hybrid circuits; means for separately supplying signals to be switched to the four inputs of one pair of said hybrid circuits in a pre-determined phase relationship; and means connecting each of the output terminations of each of the hybrid circuits of said one pair of hybrid circuits to an input termination of a different one of the second pair of hybrid circuits, the utilisation devices each being connected to a separate and individual output termination of the second pair of hybrid circuits.

Preferably the means for supplying signals in a predetermined phase relationship comprises a further two pairs of hybrid circuits, means for supplying signals to be switched to one or more of the four inputs of one pair of said further hybrid circuits, means connecting each of the output terminations of each of the hybrid circuits of said one pair of further hybrid circuits to an input termination of a different one of the second pair of said further hybrid circuits, and amplifier means connected to each of the output terminations of each of said second pair of further hybrid circuits.

Preferably said utilisation devices are aerials.

Preferably said hybrid circuits are 3db couplers, although other hybrid circuits, such as rat races, Magic T's etc., may be utilised in carrying out the invention.

Figure 2:
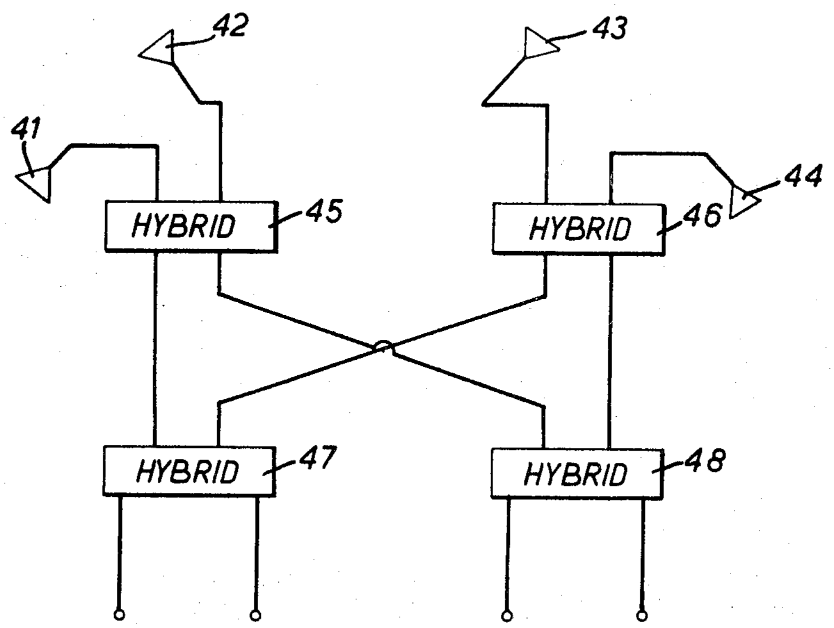
Figure 1:
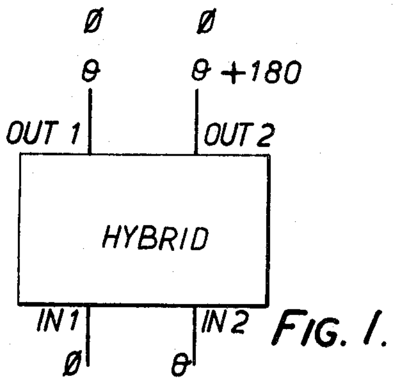
Figure 3:
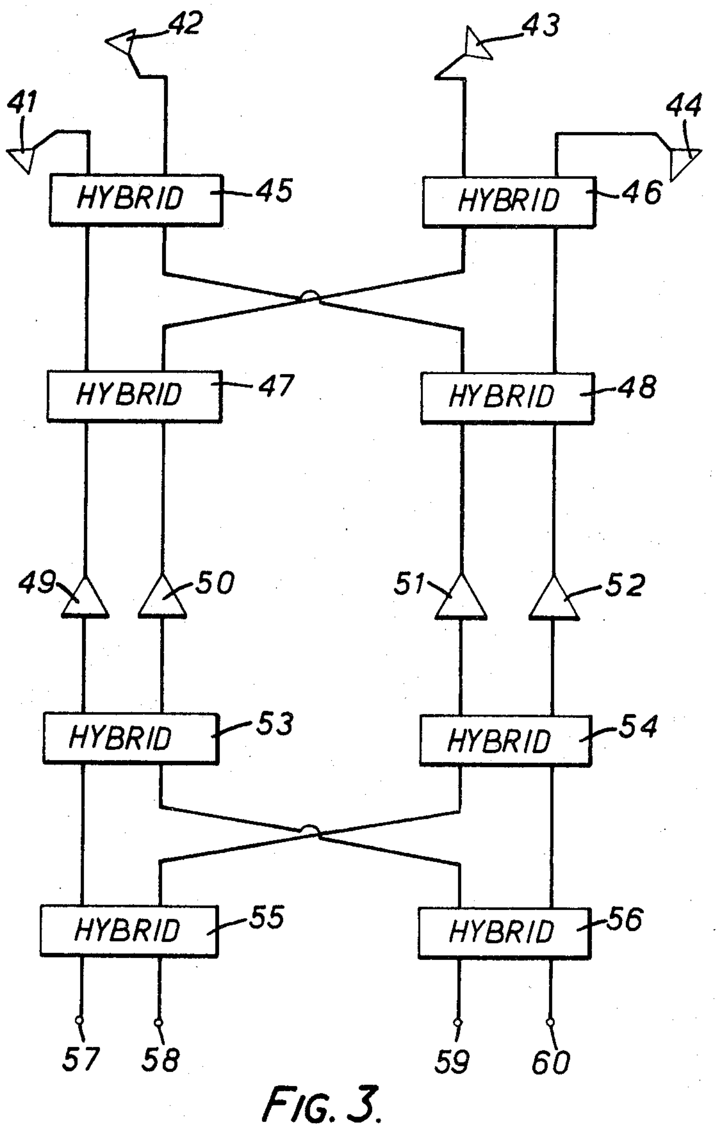

The invention will now be described by way of examples with reference to the accompanying drawings in which FIG. 1 is a diagrammatic representation of a hybrid circuit;

FIG. 2 shows diagrammatically one embodiment of a switching system in accordance with the invention for feeding four aerials and FIG. 3 shows diagrammatically the switching system of FIG. 2 with additional circuitry for providing signals of the desired phase at the inputs to the switching system.

Referring to FIG. 1 of the drawings a hybrid circuit of the 3db coupler kind is shown therein having two inputs IN 1, IN 2 and two outputs OUT 1 and OUT 2. When an input of phase $\phi$ is applied to the input IN 1, the operation of the hybrid is such, as is well known, that there will be output signals present on both of the outputs OUT 1, OUT 2, and both of these signals will have the phase $\phi$. When an input signal of phase $\theta$ is applied to the input IN 2 there will be output signals present on both of the outputs OUT 1, OUT 2, the signal present on the output OUT 1 having a phase of $\theta$ and the signal present on the output OUT 2 having a phase of $\theta + 180°$. Thus if $\theta = \phi$ and the input signals have the same amplitude and frequency the signals present at the output OUT 1 will combine, whereas those at the output OUT 2 will cancel each other out. Similarly for the same amplitude and frequency if $\theta = \phi + 180$ the signals present at the output OUT 1 will cancel each other out, whereas those present at the output OUT 2 will combine.

FIG. 2 shows a switching system in use as a feeding system for a four element aerial. The switching system utilises four hybrid circuits 45 – 48 as shown in FIG. 1. Four aerial elements 41, 42, 43 and 44 are each connected to an output of the hybrids 45 and 46. The inputs of the hybrids 45 and 46 are each connected to a separate output of a different one of the hybrids 47 and 48. Signals to be transmitted are supplied to the inputs of hybrids 47 and 48 in a pre-determined phase relationship, depending upon which aerial element is to be energised.

If element 41 is to be energised the phase relationships of the signals at the four inputs of the hybrids 47 and 48 are as indicated at *a* and the phase relationships indicated at *b c* and *d* correspond to those necessary for the energisation of aerial elements 42, 43 and 44 respectively.

Although the apparatus has been described above for the particular application in which solely one aerial element is to be activated at any one time it is clear that if two sets of signals of different frequency are provided to the inputs of the hybrids 47 and 48, each of these sets of signals having a different one of the phase relationships *a, b, c* or *d* then two corresponding aerial elements will be energised simultaneously with different frequency signals.

In FIG. 3 there is shown the further circuitry required to produce signals of the required phase relationships *a, b, c* and *d* at the inputs of the switching system of FIG. 2, as the switching system has the same part references in FIG. 3 as in FIG. 2. In the system illustrated signals which are to be radiated are fed to one of the inputs 57, 58, 59, 60 of a pair of hybrids 55, 56. The outputs of each of the hybrids 55, 56 are each connected to an individual input of a different one of a pair of hybrids 53, 54 and the outputs of the hybrids 53, 54 are connected to the inputs of the hybrids 47, 48 via four broad band amplifiers 49 to 52.

If a signal to be radiated is applied to the input terminal 57 the two outputs of the hybrid 55 will be in phase as described with reference to FIG. 1. Similarly it can be seen that the four outputs of the hybrids 53 and 54 will also be in phase. These four signals are each amplified by one of the amplifiers 49, 50, 51, 52, the outputs of these amplifiers will also all be in phase, and will have the required phase relationship indicated at (a) in FIG. 2 for providing radiation from only aerial 41.

Similarly, if a signal to be radiated is applied to input terminal 58, one of the outputs of the hybrid 55 will have a phase shift of 180° with respect to the input, while the other will be in phase. The output having the phase shift is fed to the hybrid 54, and it can be seen that both of the ouputs of the hybrid 54 will have a phase shift of 180° with respect to the signal applied to terminal 58. The output of hybrid 55 having no phase shift with respect to the input signal is fed to the hybrid 53, and the outputs of that hybrid will also have no phase shift with respect to the input. In this case the outputs of the amplifiers will have the phase relationship indicated at (b) in FIG. 2 and consequently only aerial 42 will be radiated.

Similarly signals applied to input terminal 59 will be radiated by aerial 43 and signals applied to input terminal 60 will be radiated by aerial 44. In the system illustrated any signal applied to any of the inputs is amplified by all four of the amplifiers. It is possible to apply several signals of different frequency simultaneously to the inputs 57, 58, 59, 60 of the system and signal applied to these inputs will be radiated by aerials 41, 42, 43, 44 respectively. Of course it is possible to apply more than one signal to each input terminal, in which case all of the signals applied to that input terminal will be radiated by the respective aerial.

Such an arrangement may be used in communications systems covering a broad band width, and the system can if desired be repeatedly doubled up to feed eight outlets, sixteen outlets, etc.

I claim:

1. A switching system suitable for switching signals from a plurality of inputs to a selectable one of four utilisation devices comprising two pairs of hybrid circuits; means for separately supplying signals to be switched to the four inputs of one pair of said hybrid circuits in a predetermined phase relationship; means connecting each of the output terminations of each of the hybrid circuits of said one pair of hybrid circuits to an input termination of a different one of the second pair of hybrid circuits, the utilisation devices each being connected to a separate and individual output termination of the second pair of hybrid circuits, said means for supplying signals in a pre-determined phase relationship comprising a further two pairs of hybrid circuits, means for supplying signals to be switched to one or more of the four inputs of one pair of said further hybrid circuits, means connecting each of the output terminations of each of the hybrid circuits of said one pair of further hybrid circuits to an input termination of a different one of the second pair of said further hybrid circuits, and amplifier means connected to each of the output terminations of each of said second pair of further hybrid circuits.

2. An arrangement for selectively applying a signal of predetermined frequency to any one of four utilisation devices, comprising two pairs of hybrid circuits; first and second input means and first and second output means on each hybrid circuit, each circuit providing output signals on said first and second output means which are respectively the algebraic sum and difference of signals applied to said first and second input means, the first output means of the hybrid circuit of the first pair being connected to the first and second input means respectively of one hybrid circuit of the second pair, the second output means of the hybrid circuits of the first pair being connected to the first and second input means respectively of the other hybrid circuit of the second pair, and each of the four utilisation devices being connected to a respective one of the four output means of the second pair of hybrid circuits and means for applying simultaneously to the four input means of the hybrid circuits of the first pair signals having the same frequency and a selectable phase relationship whereby the signal reinforcement and cancelling produced by each hybrid circuit at its first and second output means causes a signal of said predetermined frequency to be applied to a selected one of said four utilisation devices in accordance with the selected phase relationship.

3. A switching system as claimed in claim 2 wherein said utilisation devices are aerials.

4. A switching system as claimed in claim 2 wherein said hybrid circuits are 3db couplers.

5. An arrangement for selectively applying a signal of predetermined frequency to any one of four utilization devices, which comprises in combination:

two pairs of hybrid circuits, each having first and second input means and first and second output means, the first output means of one pair of hybrids being connected respectively to the first and second input means of one hybrid circuit of the other pair and the second output means of said one pair being connected respectively to the second input means of the other hybrid circuit of said other pair, the output means of said other pair being connected individually to the utilization devices;

means for selectively applying one of four patterns of input signals to the input means of said one pair of hybrid circuits, each pattern being different from the other patterns and each pattern consisting of four signals which are structured from in-phase and phase-opposition signals of said predetermined frequency; and each hybrid circuit producing signals at its first and second output means which are in phase with a signal applied to one of its input means and producing signals at its first and second output means which respectively are in phase with and in phase opposition to a signal applied to the other of its input means, whereby each pattern of input signals produces an output signal of said predetermined frequency at a different one of said output means of said other pair of hybrid circuits.

6. An arrangement as defined in claim 5 wherein said means for selectively applying said patterns of input signals comprises two pairs of further hybrid circuits having the same characteristics and connections as the two pairs of hybrid circuits first mentioned, one pair of said further hybrid circuits having four output means connected to the input means of said one pair of said first mentioned hybrid circuits, and the other pair of said further hybrid circuits having four input means for producing said patterns of input signals in response to individual excitations by a signal of said predetermined frequency.

* * * * *